(12) United States Patent
Dennis et al.

(10) Patent No.: US 10,384,284 B2
(45) Date of Patent: Aug. 20, 2019

(54) CARBIDE WEAR SURFACE AND METHOD OF MANUFACTURE

(71) Applicant: Dennis Tool Company, Houston, TX (US)

(72) Inventors: Mahlon D. Dennis, Kingwood, TX (US); Thomas M. Dennis, Kingwood, TX (US); Richard W. Lewis, Tomball, TX (US)

(73) Assignee: Syntex Super Materials, Inc., Houston, TX (US)

( * ) Notice: Subject to any disclaimer, the term of this patent is extended or adjusted under 35 U.S.C. 154(b) by 0 days.

(21) Appl. No.: 14/866,953

(22) Filed: Sep. 26, 2015

(65) Prior Publication Data

US 2016/0016244 A1    Jan. 21, 2016

Related U.S. Application Data

(62) Division of application No. 13/351,300, filed on Jan. 17, 2012, now abandoned.

(51) Int. Cl.
*B23K 13/01* (2006.01)
*B23K 1/002* (2006.01)
(Continued)

(52) U.S. Cl.
CPC .............. *B23K 1/002* (2013.01); *B23K 1/19* (2013.01); *B23K 35/226* (2013.01); *B23K 35/30* (2013.01);
(Continued)

(58) Field of Classification Search
CPC ........ B23K 35/30; B23K 35/226; B23K 1/19; B23K 1/002; B23K 2201/34; B23K 2203/04; B23K 2203/50; F16C 33/043; F16C 33/14; F16C 2220/20; F16C 2220/66; F16C 2220/60; F16C 2352/00;
(Continued)

(56) References Cited

U.S. PATENT DOCUMENTS 3,127,224 A    3/1964    Owens et al.
4,017,480 A    4/1977    Baum
(Continued)

OTHER PUBLICATIONS

Extended European Search Report received in European Application No. 13738038.2, dated Dec. 18, 2015, 7 pages.
(Continued)

*Primary Examiner* — Hung D Nguyen
(74) *Attorney, Agent, or Firm* — Hubbard Johnston, PLLC

(57) ABSTRACT

A radial bearing having a wear surface with improved wear characteristics comprises a steel support, to which is bonded a metal carbide composite wear surface made by first arranging, within a cavity defined between a steel mold and the steel support, tiles made of microwave sintered, cemented metal carbide, closely packing the voids between the tiles with metal carbide powder, and infiltrating the mold cavity with a metal brazing alloy by subjecting the filled mold to rapid heating. The brazing alloy fills voids between the metal carbide particles, the microwave sintered metal carbide tiles, and the metal support, thereby relatively rapidly consolidating the carbide into a wear layer bonded with the steel support without substantially damaging the properties of the microwave-sintered metal carbide tiles.

16 Claims, 7 Drawing Sheets

(51) Int. Cl.
| | |
|---|---|
| *E21B 4/00* | (2006.01) |
| *F16C 33/04* | (2006.01) |
| *B23K 1/19* | (2006.01) |
| *B23K 35/22* | (2006.01) |
| *B23K 35/30* | (2006.01) |
| *E21B 10/22* | (2006.01) |
| *B23K 101/34* | (2006.01) |
| *B23K 103/04* | (2006.01) |
| *B23K 103/00* | (2006.01) |
| *F16C 33/14* | (2006.01) |

(52) U.S. Cl.
CPC ............ *E21B 4/003* (2013.01); *F16C 33/043* (2013.01); *B23K 2101/34* (2018.08); *B23K 2103/04* (2018.08); *B23K 2103/50* (2018.08); *E21B 10/22* (2013.01); *F16C 33/14* (2013.01); *F16C 2206/82* (2013.01); *F16C 2220/20* (2013.01); *F16C 2220/60* (2013.01); *F16C 2220/66* (2013.01); *F16C 2220/70* (2013.01); *F16C 2223/06* (2013.01); *F16C 2223/30* (2013.01); *F16C 2226/12* (2013.01); *F16C 2226/34* (2013.01); *F16C 2352/00* (2013.01); *Y10T 428/164* (2015.01)

(58) Field of Classification Search
CPC .............. F16C 2206/82; F16C 2226/34; F16C 2223/30; F16C 2223/06; F16C 2226/12; F16C 2220/70; E21B 10/22; E21B 4/003; Y10T 428/164
USPC .... 219/615, 607, 609, 616, 617; 384/92, 95, 384/282, 284, 285, 302–312, 910
See application file for complete search history.

(56) References Cited

U.S. PATENT DOCUMENTS

| | | |
|---|---|---|
| 4,247,305 A | 1/1981 | Daniels et al. |
| 4,255,165 A | 3/1981 | Dennis et al. |
| 4,323,130 A | 4/1982 | Dennis |
| 4,339,896 A | 7/1982 | Dennis et al. |
| 4,538,691 A | 9/1985 | Dennis |
| RE32,036 E | 11/1985 | Dennis |
| 4,592,433 A | 6/1986 | Dennis |
| 4,632,196 A | 12/1986 | Dennis |
| 4,640,374 A | 2/1987 | Dennis |
| 4,662,896 A | 5/1987 | Dennis |
| 4,705,123 A | 11/1987 | Dennis |
| 4,716,975 A | 1/1988 | Dennis |
| 4,719,076 A | 1/1988 | Geczy et al. |
| 4,719,516 A | 1/1988 | Nagashima |
| 4,720,199 A | 1/1988 | Geczy et al. |
| 4,727,945 A | 3/1988 | Dennis |
| 4,732,491 A | 3/1988 | Geczy |
| 4,739,845 A | 4/1988 | Dennis |
| 4,749,052 A | 6/1988 | Dennis |
| 4,756,631 A | 7/1988 | Jones |
| 4,784,023 A | 11/1988 | Dennis |
| 5,120,327 A | 6/1992 | Dennis |
| 5,154,245 A | 10/1992 | Waldenstrom et al. |
| 5,217,081 A | 6/1993 | Waldenstrom et al. |
| 5,264,283 A | 11/1993 | Waldenstrom et al. |
| 5,335,738 A | 8/1994 | Waldenstrom et al. |
| 5,342,129 A | 8/1994 | Dennis et al. |
| 5,379,854 A | 1/1995 | Dennis |
| 5,452,843 A | 9/1995 | Dennis |
| 5,456,329 A | 10/1995 | Dennis et al. |
| 5,477,034 A | 12/1995 | Dennis |
| 5,496,638 A | 3/1996 | m et al. |
| 5,498,081 A | 3/1996 | Dennis et al. |
| 5,499,688 A | 3/1996 | Dennis |
| 5,524,719 A | 6/1996 | Dennis |
| 5,544,713 A | 8/1996 | Dennis |
| 5,566,779 A | 10/1996 | Dennis |
| 5,624,068 A | 4/1997 | Waldenstrom et al. |
| 5,630,479 A | 5/1997 | Dennis |
| 5,641,921 A | 6/1997 | Dennis et al. |
| 5,647,449 A | 7/1997 | Dennis |
| 5,709,279 A | 1/1998 | Dennis |
| 5,715,899 A | 2/1998 | Liang et al. |
| 5,816,347 A | 10/1998 | Dennis et al. |
| 5,848,348 A | 12/1998 | Dennis |
| 6,004,505 A | 12/1999 | Roy et al. |
| 6,011,248 A | 1/2000 | Dennis |
| 6,063,333 A | 5/2000 | Dennis |
| 6,066,290 A | 5/2000 | Dennis et al. |
| 6,126,895 A | 10/2000 | Dennis et al. |
| 6,213,931 B1 | 4/2001 | Twardowski et al. |
| 6,315,066 B1 | 11/2001 | Dennis |
| 6,488,103 B1 | 12/2002 | Dennis et al. |
| 6,500,226 B1 | 12/2002 | Dennis |
| 6,512,216 B2 | 1/2003 | Gedevanishvili et al. |
| 6,610,241 B2 | 8/2003 | Shrout et al. |
| 6,682,580 B2 | 1/2004 | Findeisen et al. |
| 6,805,835 B2 | 10/2004 | Roy et al. |
| 7,712,549 B2 | 5/2010 | Dennis et al. |
| 2003/0220157 A1 | 11/2003 | Dennis et al. |
| 2005/0211702 A1 | 9/2005 | Gigl et al. |
| 2006/0102388 A1 | 5/2006 | Dennis et al. |
| 2006/0237234 A1 | 10/2006 | Dennis et al. |
| 2010/0239447 A1 | 9/2010 | Bush |
| 2010/0282519 A1 | 11/2010 | Zhang et al. |
| 2010/0320005 A1 | 12/2010 | Burhan et al. |
| 2011/0011965 A1* | 1/2011 | Mirchandani ........... B22F 7/062 241/277 |
| 2011/0287238 A1 | 11/2011 | Stevens et al. |
| 2011/0297449 A1 | 12/2011 | Dennis |
| 2012/0012319 A1 | 1/2012 | Dennis |

OTHER PUBLICATIONS

"Conforma Clad(r) Mud Motor Radial Bearings" Application Bulletin, Conforma Clad, a Kennametal Company copyright 2006 (2 pages).
Belohalav, A., "Understanding Brazing Fundamentals," The American Welder, Sep./Oct. 2000, 6 pages.
International Search Report and Written Opinion received in Patent Cooperation Treaty Application No. PCT/US2013/021989, dated May 14, 2013, 10 pages.
Wikipedia, "Welding," http://en.wikipedia.org/wik/Welding, printed on Aug. 4, 2014, 19 pages.

* cited by examiner

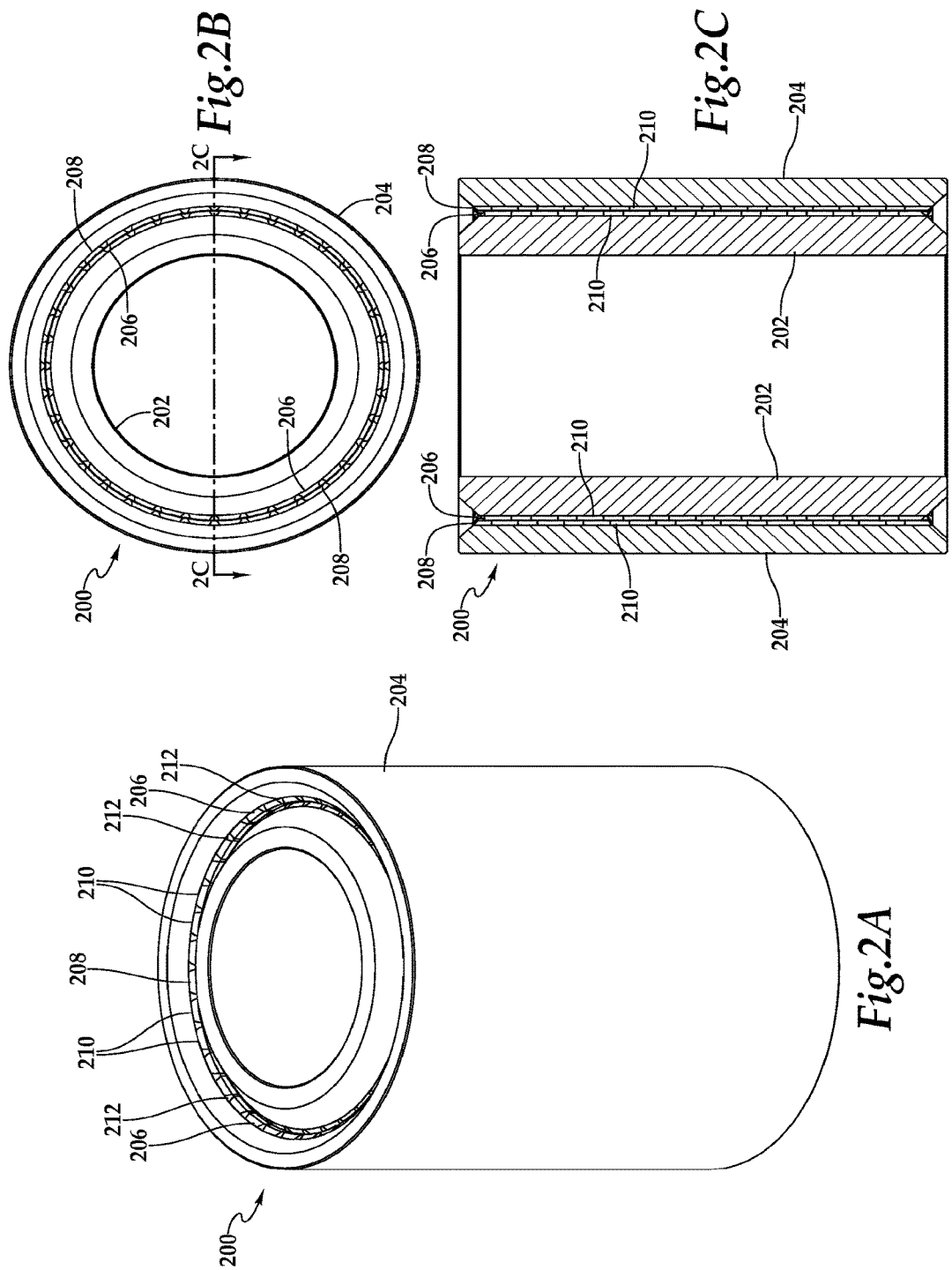

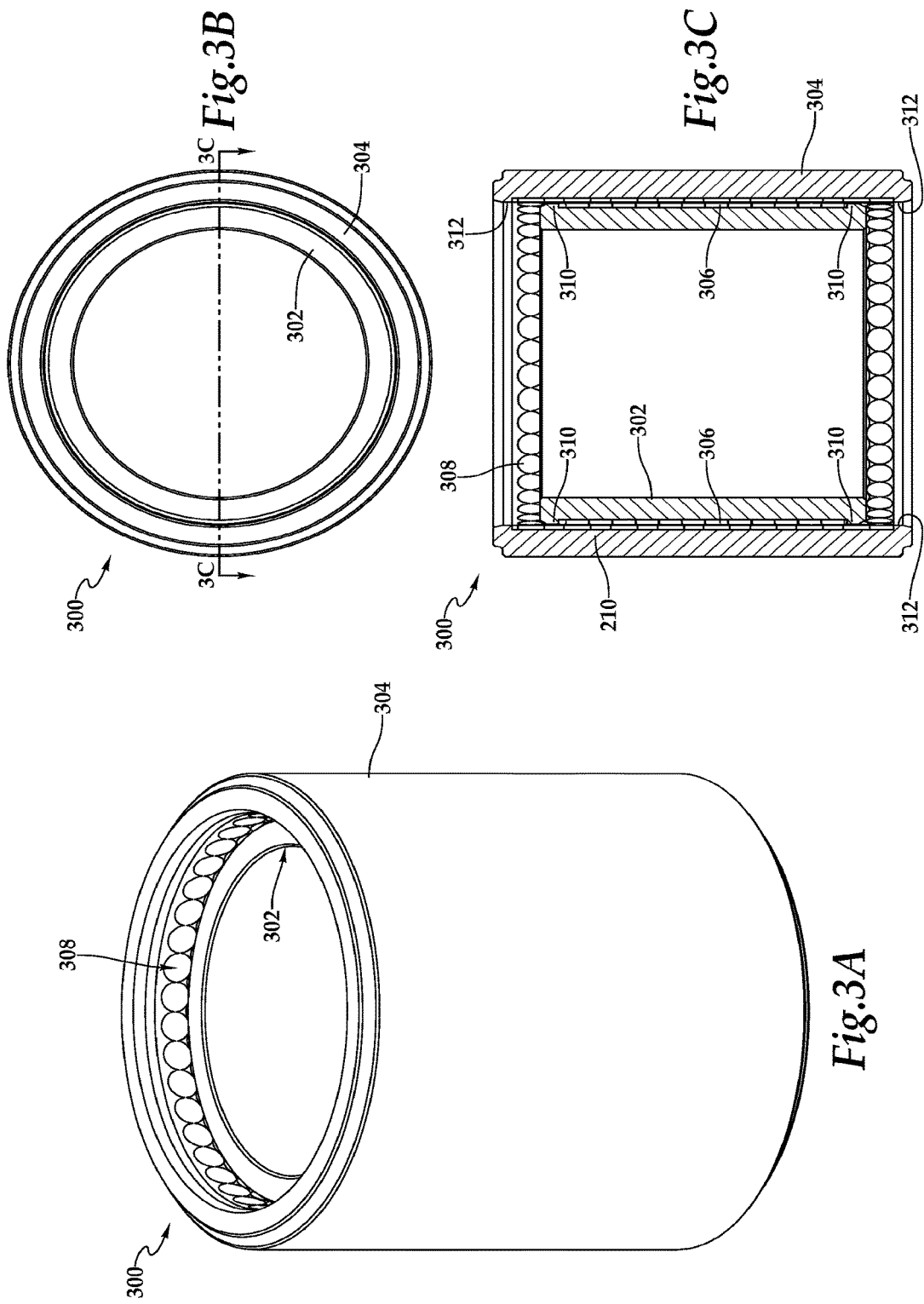

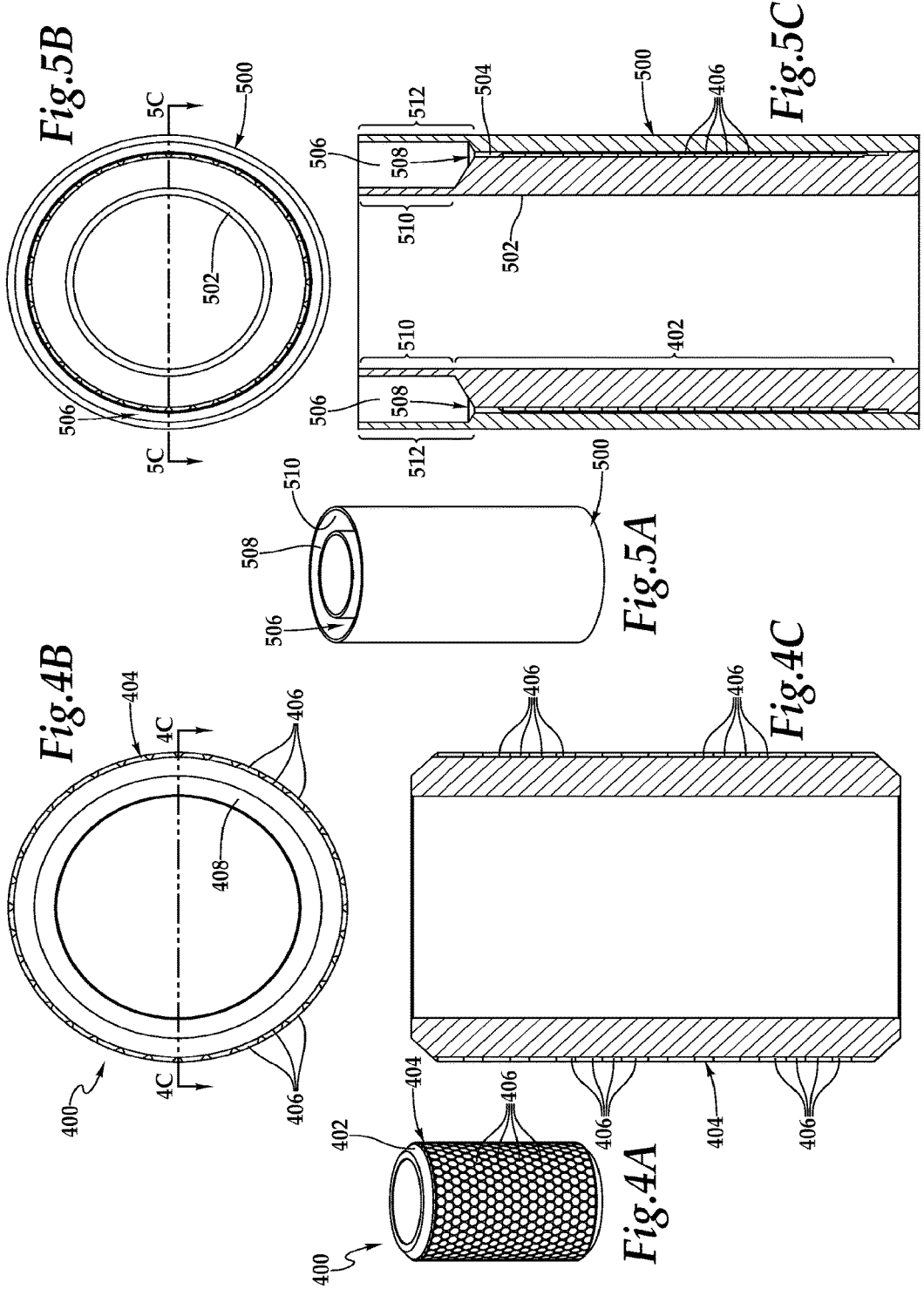

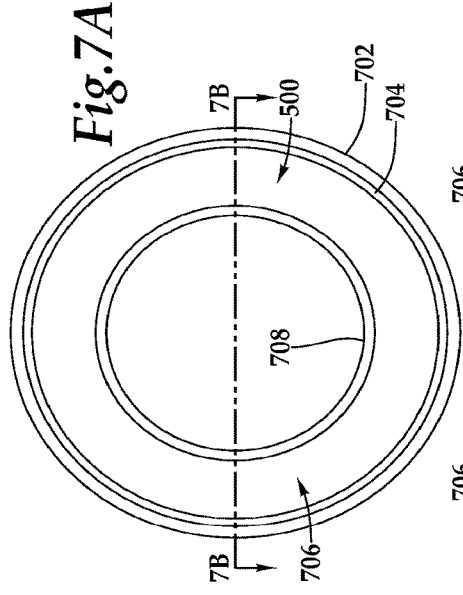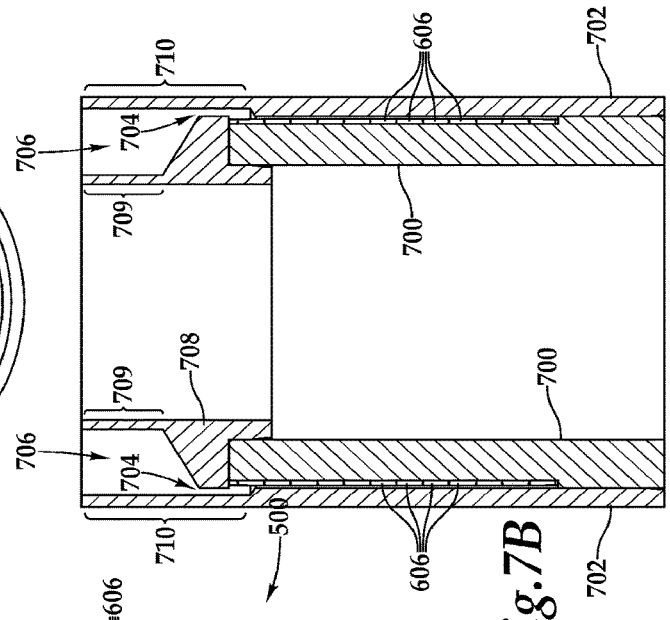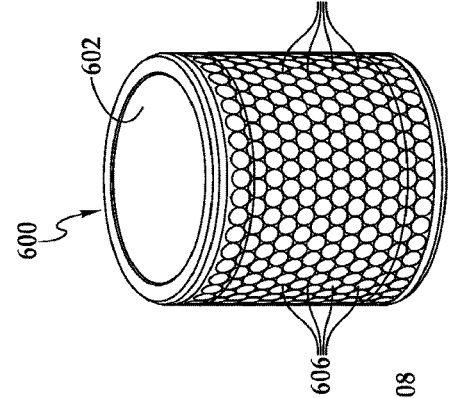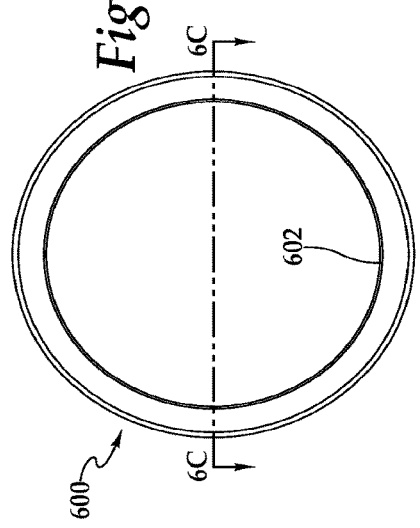

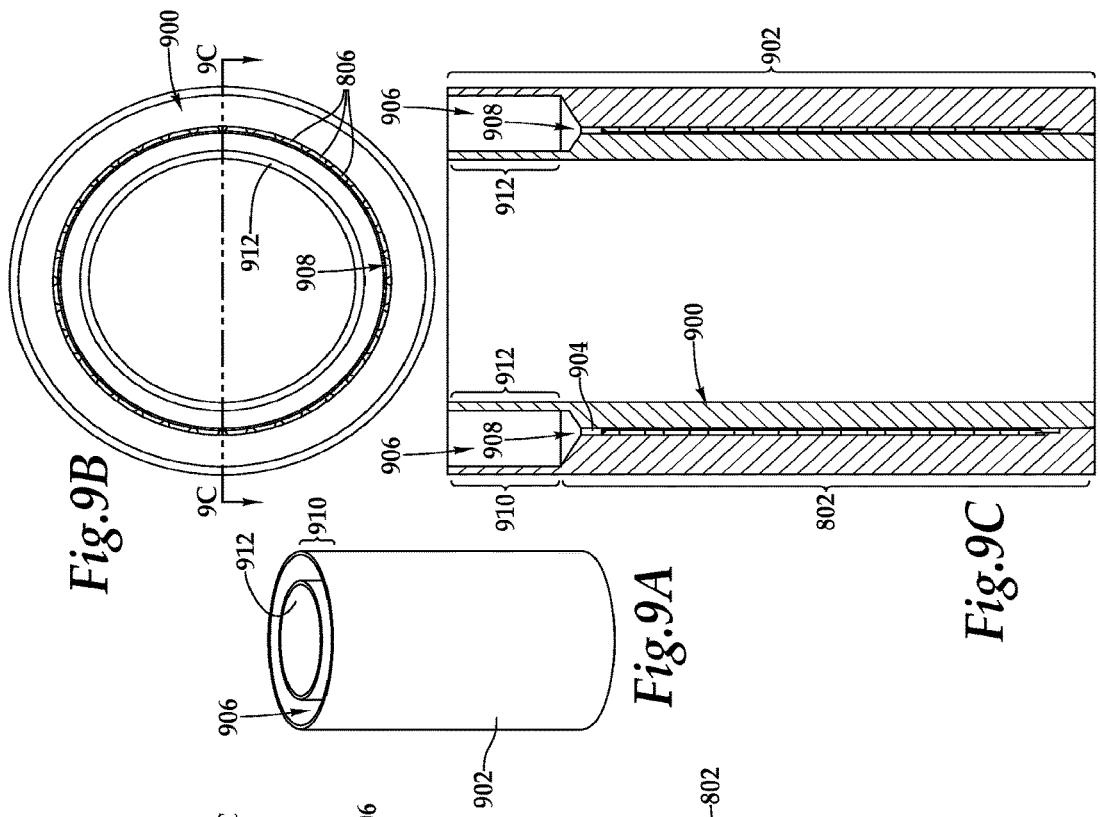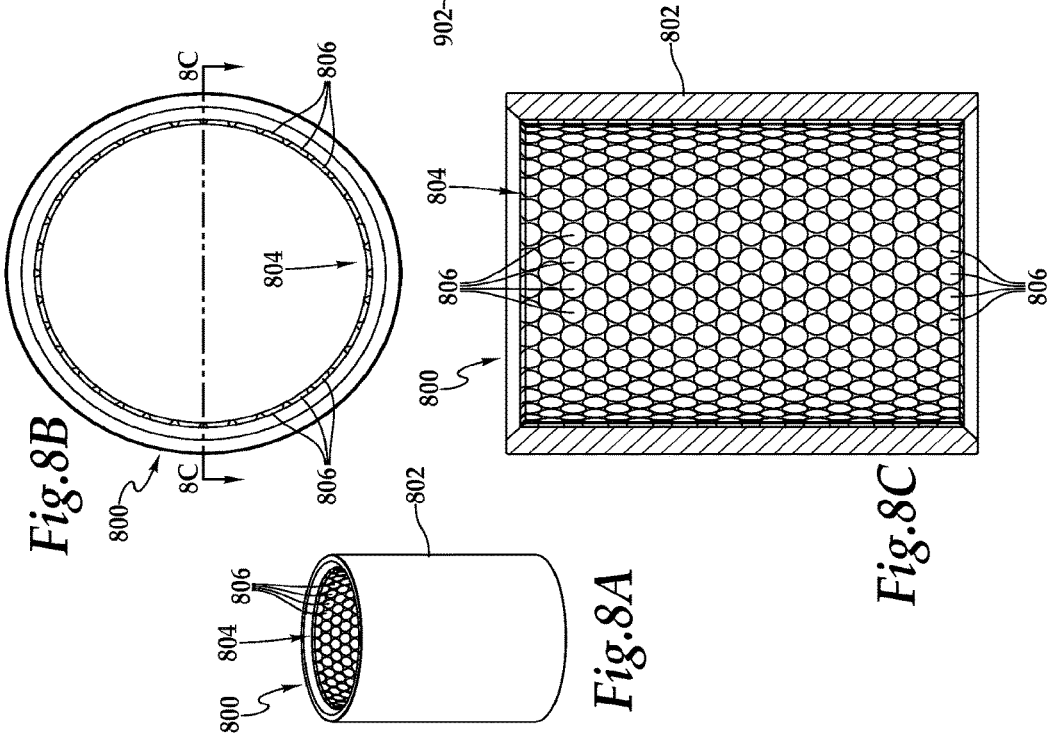

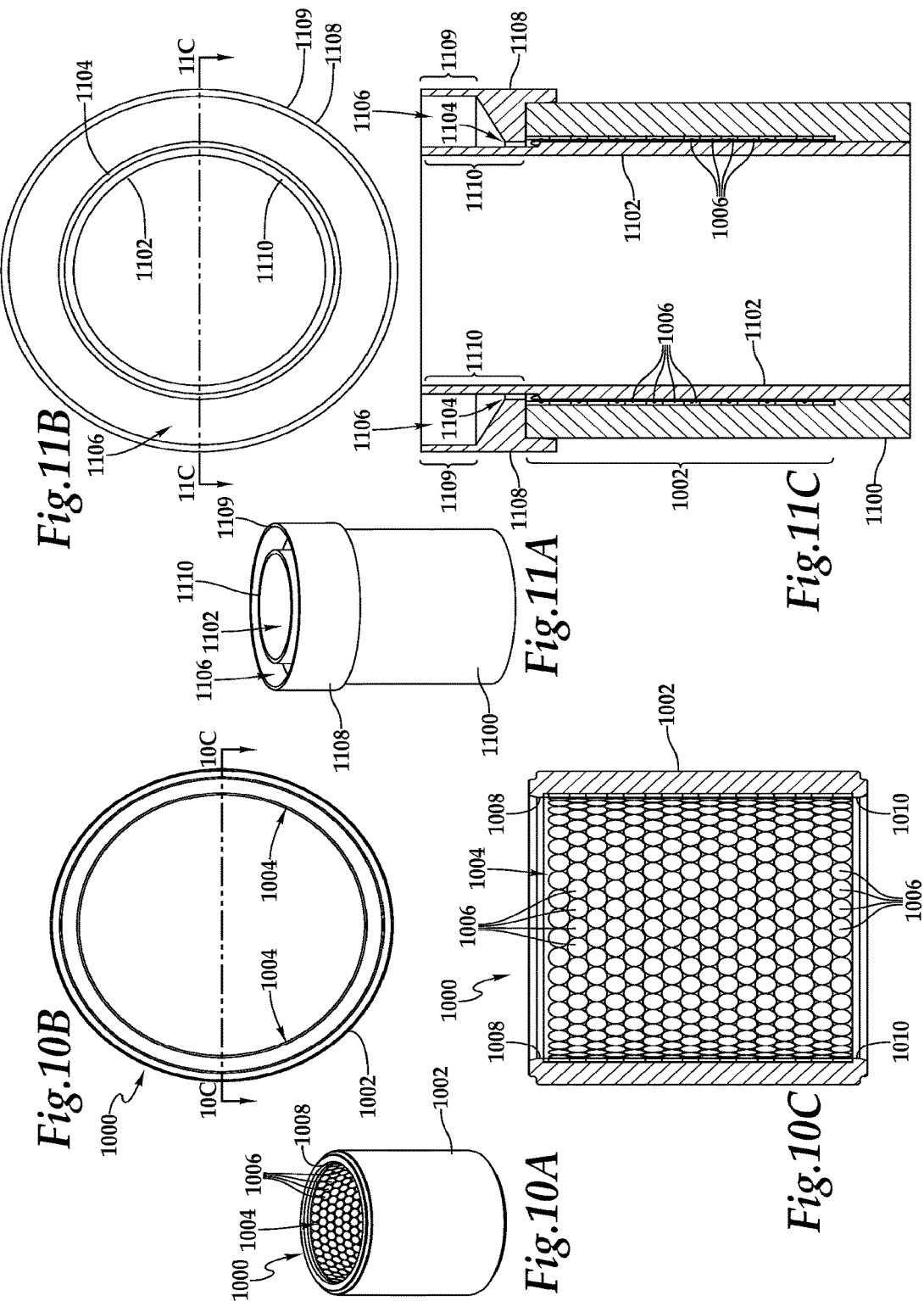

CARBIDE WEAR SURFACE AND METHOD OF MANUFACTURE

RELATED APPLICATION

This application is a divisional of U.S. patent application Ser. No. 13/351,300 filed Jan. 17, 2012, the entirety of which is hereby incorporated by reference.

BACKGROUND

Tools used in connection with drilling of oil and gas wells are subject to considerable abrasion and wear during use. For example, mud-lubricated radial bearings used as drill bits, rock mills, mud motors, are subject to highly abrasive particles found in drilling fluids and frequently require replacement. Metal carbides, particularly tungsten carbide (WC), are used to form a bearing or wear surface for downhole tools because of their desirable properties of hardness, toughness and wear resistance. There are a number of different methods for applying tungsten carbide to a substrate or support to form a wear surface for a bearing.

Conforma Clad®, a brazed tungsten carbide cladding, sold by Kennametal, is one example of a tungsten carbide wear surface that can be used for bearings. Examples of commercially available products with Conforma Clad® wear surfaces include radial bearings used in downhole mud motors. These tungsten carbide clad surfaces are fabricated by overlaying a surface of an object to be clad to form a wear surface with a cloth containing tungsten carbide powder, mixed with a binder, and then laying on top of it another cloth containing a braze alloy before subjecting the part to heating to melt the binder phase and the braze.

Another method, described in U.S. Pat. No. 4,719,076, uses a blend of macro-crystalline tungsten carbide powder and cemented tungsten carbide cobalt chips to create a hard wear surface on a radial bearing. The mixture described in U.S. Pat No. 4,719,076 is comprised of sixty percent by weight of 80 mesh macro-crystalline tungsten carbide, commercially available as the Kennametal product called P-90, and forty percent by weight of cemented tungsten carbide cobalt crushed chips with a mesh size of 10/18. The percentage of weight of tungsten carbide cobalt chips is from forty to eighty percent by weight. To create a bearing surface, a steel blank is surrounded by a graphite mold and the blended mixture of macro-crystalline tungsten carbide and cemented tungsten carbide chips is loaded into a cavity created between the steel blank and graphite mold. After the mold contents are vibrated to achieve maximum density of the blended mixture tungsten powder, copper based infiltrant is then placed in a funnel shaped ring formed around the top of the mold. The mold is then heated to 2050 degrees Fahrenheit, plus or minus 25 degrees Fahrenheit, by induction heating, causing the copper infiltrant to melt and infiltrate the heated powder mixture in the cavity through capillary action. Once infiltrated, it is slowly cooled to room temperature. After cooling, the parts are machined to specific dimensions by grinding.

Cemented tungsten carbide is one example of a hard composite material fabricated by mixing together a powder formed of particles of a carbide of one of the group IVB, VB, or VIB metals, with a metal binder in powdered form, pressing the mixture into a desired shape to form a "green part," and then sintering the green part to cause the binder to melt and thereby form an agglomeration of carbide particles bonded together by the metal binder phase. The binder material is typically comprised predominantly of cobalt, nickel, or iron, and alloys of them. The most common example of a cemented metal carbide composite used in downhole applications is tungsten carbide (WC) with a cobalt binder.

Microwave sintering of metal carbides with a metal alloy as a catalyst or binder phase material is described in several patents, including U.S. Pat. Nos. 6,004,505, 6,512,216, 6,610,241, 6,805,835, all of which are incorporated herein by reference. In a microwave sintering process, loose grains of metal carbide, which constitute a metal carbide powder, and a metal binder powder are combined to form an homogenous mixture, which is then shaped or formed into a "green" part that has very near the dimensions and shape of a desired cemented metal carbide part. The green part is formed, for example, by compacting the carbide and binder powders into a mold by cold pressing. It may also be precast with a sacrificial wax if necessary. One example of a metal carbide is tungsten carbide. The metal binder that is typically used is a metal alloy containing about 80 to 100 percent cobalt. Additional materials can also be added to the mixture. The green part is then sintered using microwave radiation to heat the part to a point that is below the melting temperature of the metal carbide, but high enough to cause the metal binder to melt throughout the matrix of metal carbide grains, resulting in the particles of carbide fusing or adhering to one another to thereby form a single, solid mass. Microwave heating shortens sintering times. Shorter sintering times result in less chemical and phase change in the metal binder, which is typically cobalt or an alloy containing cobalt. More even heating is also possible, which results in more uniform shrinkage of the part and more uniform distribution of the binder during cooling. Shorter sintering times also result in smaller changes in the size of the grains. Smaller changes in the grain size result in more predictable and consistent carbide grain structures. Microwave sintering also allows for uniform cooling after sintering, which allows for better management of stresses within the part and better phase control of the metal binder. A microwave sintered metal carbide part typically possesses higher modulus of elasticity, yield strength, and impact strength and greater thermal and electric conductivity as compared to a part having the same starting materials sintered using conventional HP/HT and HIP methods.

SUMMARY

An article having a wear surface with improved wear characteristics comprises, in one example, a steel support to which is bonded a metal carbide composite wear surface made by first arranging, within a cavity defined between a mold and the steel support, tiles made of cemented metal carbide, closely packing the voids between the tiles with spherical metal carbide powder, and infiltrating the mold cavity with a metal brazing alloy by subjecting the filled mold to rapid heating. In one embodiment, the heating lasts for a period of less than one hour. The brazing alloy fills voids between the spherical metal carbide particles, the cemented metal carbide tiles, and the metal support, thereby relatively rapidly consolidating the metal carbide into a wear layer bonded with the steel support without substantially damaging the properties of the microwave sintered metal carbide tiles. The mold is removed by machining or grinding it away, exposing the wear surface, which then is machined and polished to desired dimensions.

In one exemplary embodiment, the mold is made of steel for enabling more rapid and even heating using an induction furnace.

A radial bearing of this type, made with tiles of microwave sintered tungsten carbide cemented with cobalt, and using a brazing alloy containing copper (Cu), nickel (Ni), and manganese (Mn), can have substantially improved wear characteristics as compared, for example, to one with a wear surface made from a Conforma Clad tungsten carbide cladding. Subjecting the mold to less than one hour of heating helps to preserve the properties of the microwave sintered tungsten carbide tiles by reducing diffusion of cobalt from the tiles into the brazing alloy.

BRIEF DESCRIPTION OF THE DRAWINGS

FIGS. 2A, 2B and 2C are, respectively, perspective, top and cross-section views of a first example of a radial bearing made according to the method of FIG. 1.

FIGS. 3A, 3B, and 3C are, respectively, perspective, top and cross-section views of a second example of a radial bearing made according to the method of FIG. 1.

FIGS. 4A and 4B are, respectively, perspective and top views of an example of the inner radial bearing shown in FIGS. 2A-2C, with a wear surface made according to the method of FIG. 1, and FIG. 4C is a cross section of FIG. 4B taken along section line 4C-4C.

FIGS. 5A and 5B are, respectively, perspective and top views of an assembly of a mold and mandrel for making the inner bearing shown in FIGS. 4A-4C, and FIG. 5C is a cross section of FIG. 5B taken along section line 5C-5C.

FIGS. 6A and 6B are, respectively, perspective and top views of the example of an inner radial bearing shown in FIGS. 3A-3C, with a wear surface made according to the method of FIG. 1, and FIG. 6C is a cross section of FIG. 6B taken along section line 6C-6C.

FIG. 7A is a top view of an assembly of a mold and mandrel for making the inner bearing shown in FIGS. 6A-6C, and FIG. 7B is a cross section of FIG. 7A taken along section line 7B-7B.

FIGS. 8A and 8B are, respectively, perspective and top views of the example of an outer radial bearing with a wear surface shown in FIGS. 2A-2C and made according to the method of FIG. 1, and FIG. 8C is a cross section of FIG. 8B taken along section line 8C-8C.

FIGS. 9A and 9B are, respectively, perspective and top views of an assembly of a mold and mandrel for making the inner bearing shown in FIGS. 8A-8C, and FIG. 9C is a cross section of FIG. 9B taken along section line 9C-9C FIGS. 10A and 10B are, respectively, perspective and top views of the example of an outer radial bearing shown in FIGS. 3A-3C, with a wear surface made according to the method of FIG. 1, and FIG. 10C is a cross section of FIG. 10B taken along section line 10C-10C.

FIGS. 11A and 11B are, respectively, perspective and top views of an assembly of a mold and mandrel for making the outer radial shown in FIGS. 10A-10C, and FIG. 11C is a cross section of FIG. 11B taken along section line 11C-11C.

DETAILED DESCRIPTION OF EXEMPLARY EMBODIMENTS

Figure 1:
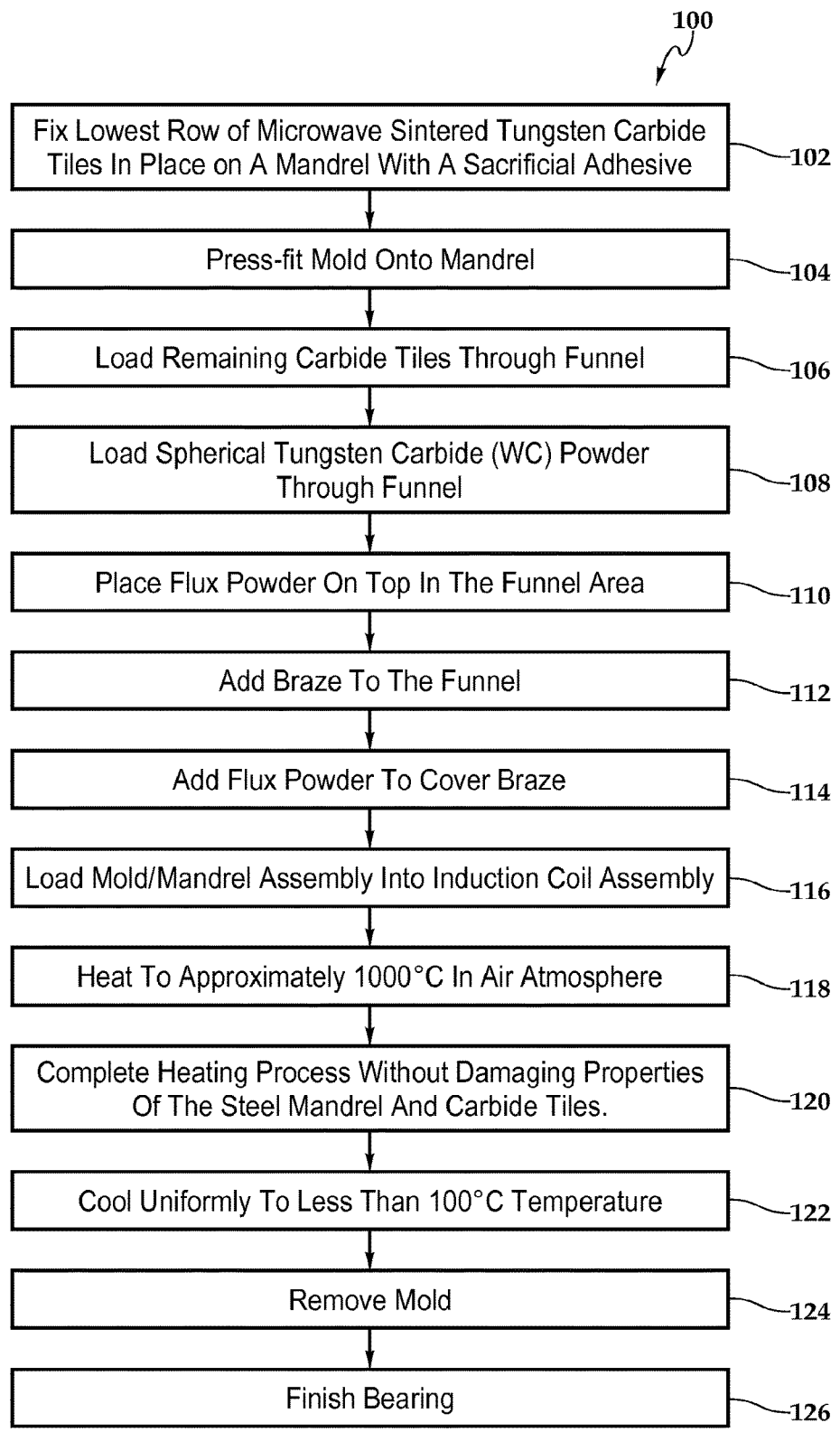
FIG. 1 is a flow chart representing certain steps of an exemplary process for manufacturing a radial bearing have a metal carbide wear surface.

In the following description, like numbers refer to like elements.

FIG. 1 describes a process 100 for fabricating a part of a radial bearing suitable for a downhole application. Although the process is particularly advantageous for fabricating a radial bearing having enhanced durability for downhole applications, it could be adapted for fabricating wear surfaces on other objects. Examples include bearings and wear surfaces in construction, mining, or other equipment that have potential to expose a bearing or wear surface to abrasive materials. FIGS. 2A-2C and 3A-3C illustrate two variants of one example of a semi-finished, two-piece, radial bearing suitable for a downhole application. The process will be described with reference to these radial bearings.

Referring to FIGS. 2A-2C, radial bearing 200 includes an inner bearing 202 and an outer bearing 204. Just the outer bearing 204 is capable of being used as a journal for a shaft, in downhole applications. However, with drilling fluid being used as a lubricant and coolant in such applications, having wear layers on both surfaces will tend to reduce times between failures. The inner bearing is connected with a rotating shaft and the outer bearing is mounted within a housing or other element of the downhole tool. The outer diameter, or outer surface, of inner bearing 202 has applied to it a carbide wear layer 206 using process 100. Similarly, the inner diameter or surface of outer bearing 204 has applied to it a carbide wear layer 208 using process 100. Carbide layer 206 forms an outer wear surface for the inner bearing, and carbide layer 208 constitutes an inner wear surface for the outer bearing. Microwave sintered metal carbide tiles 210 can be seen arranged in a closely-spaced relationship within each wear layer, with the volume between each of the tiles filled in with infiltrated, spherical metal carbide powder 212.

Radial bearing 300 of FIGS. 3A to 3C is another example. It has an inner bearing 302 and an outer bearing 304. The outer diameter or surface of the inner bearing has applied to it a carbide wear layer 306, and the inner diameter of the outer bearing has applied to it a carbide wear layer 308. One difference, as compared to radial bearing 200 (FIGS. 2A-2C), is that the inner bearing 302 and the outer bearing 206 each include a lip 310 and 312, respectively, at each end that overhangs the respective carbide layers 306 and 308.

Referring back to FIG. 1, a first part of the exemplary process 100 involves placing tiles of a microwave sintered, metal carbide composite material in a closely spaced arrangement on a steel mandrel—a cylindrically shaped body—as a first step to forming a wear surface for a radial bearing. In one, preferred example, the tiles are microwave sintered tungsten carbide that is cemented using a cobalt alloy. However, other metals can be used as binders, including iron, nickel, and alloys of them. The mandrel forms or comprises a support component for the carbide wear layers for either the inner or outer radial bearing and, as such, acts as a substrate for the carbide wear layer. An outer bearing is formed on the inner diameter of a hollow mandrel. An inner bearing is formed on the outer diameter of a cylindrical mandrel, which may or may not be hollow. The mandrel used to form the inner bearing is made from a smaller diameter mandrel.

These tiles are made by forming a green part containing a mixture of metal carbide powder and a binder into the shape of the tile, and rapidly heating it using microwave radiation, thereby sintering the green part to form a tile made of microwave sintered tungsten carbide. A description of examples of such a process can be found in the patents referenced in the background, above. One example of the metal carbide powder is tungsten carbide powder and one example is a cobalt alloy powder.

The tiles of microwave sintered metal carbide are made relatively thin and wide. They are, in this example, also uniform in their shape dimensions with respect to each other.

Each has a substantially circular shape, substantially the same diameter, and substantially the same, uniform thickness. "Substantially the same" means that it is within acceptable manufacturing tolerances. Examples of diameters range from 5 mm to 10 mm, with thickness ranging from 0.5 mm to 3 mm. A circular shape is common and comparatively easily fabricated with desired material characteristics. However, other shapes can be used. Furthermore, having tiles with a substantially uniform shape and dimensions provides certain advantages in manufacture and is acceptable for radial bearings. However, tiles of more than one shape could be used, though uniform thickness is preferred. Optimum area and thickness of the tiles are determined in part by the curvature of the surface on which they are being placed. The tiles could be formed with a curved back and/or front surface that better approximate the curvature of the wear surface of the radial bearing.

At step 102, at least one row of cemented metal carbide tiles are affixed or attached to a steel mandrel using, for example, a sacrificial adhesive to hold them in place. These tiles may be affixed in other ways. For an inner bearing, the tiles are affixed to the outer diameter of the mandrel, and for an outer bearing, they are affixed to the inner diameter of a mandrel with a cylindrically shaped bore or hollow center. Step 102 is optional but helps to ensure correct arrangement of tiles that are subsequently loaded into a cavity formed between the mandrel and a mold by establishing a first row of tiles that are properly spaced and positioned, and that do not move. Once one or more initial rows of tiles are affixed, a mold is fit at step 104 onto the mandrel, so that the surface of the mandrel on which the wear surface will be formed faces the mold. For an inner radial bearing, the wear surface will be formed on the outer diameter of the mandrel, with the mold placed around the mandrel. For an outer bearing, the wear surface will be formed on the inner diameter of a mandrel with a hollow center or bore, with the mold being placed inside the hollow center. The mold is dimensioned so that a cavity is formed between the mold and the mandrel that is slightly greater than the thickness of the wear surface to be formed, the thickness of the cavity being just large enough to accommodate the tiles arranged around the surface of the mandrel that the mold faces.

Additional cemented metal carbide tiles are then loaded at step 106 into the cavity by dropping them through a slot or opening at one end of the cavity, between the mold and mandrel. The tiles are generally loaded one row at a time, with tiles in a row partially resting in the spaces between tiles in the row below. The result is a relatively uniform arrangement of closely spaced tiles. Some of the tiles abut one another. However, some space between the tiles may exist due to, for example, slight differences in dimensions in the tiles or a mandrel with circumference that does not match the length of the row of abutting tiles.

At step 108, metal carbide powder is loaded into the cavity. The metal carbide powder is preferably spherical. Each granule or particle of spherical metal carbide powder is, as compared to, conventional macro-crystalline carbide, generally spherical in shape. Granules of macro-crystalline tungsten carbide, such as Kennametal® P-90, have shapes that are angular and irregular. The spherical metal carbide powder is preferably tungsten carbide. "Spherical" granules are comparatively much more round and uniformly shaped, but not perfectly spherical or exactly alike. One example of spherical tungsten carbide is TEKMAT™ spherical cast tungsten carbide powder. It is preferred that the mesh size of the powder is between 25 microns and 500 microns, as those sizes result in a more durable wear surface. The mold is shaken to cause the powder to flow down and around the tiles so that it fills and is well packed into the spaces or voids between the tiles.

A funnel in the slot or opening of the cavity is positioned at the top of the mold and mandrel assembly at the top of the circular slot. In one example, the funnel is integrally formed by the mold and the mandrel. In another example, it is a separate piece that is placed on top of the assembly of the mold and mandrel. If the funnel is in place on the top of the mold and mandrel assembly near the beginning of the process—either because it is integrally formed by the mold and mandrel or it is a separate piece that is placed there—the funnel can assist with loading the metal carbide tiles and the metal carbide powder. However, it will be used primarily, if not entirely, for the purpose of holding nuggets or chunks of braze material, as well as flux, that will be used to infiltrate the tile and metal carbide powder matrix in the cavity of the mold.

As step 110, flux is added into the funnel at the top of the mold, followed by braze at step 112, and then more flux at step 114.

With the mold loaded with the cemented metal carbide tile and spherical metal carbide power, and the braze and flux loaded into the funnel, the mold is loaded into a furnace for heating at step 116. In one example the furnace is comprised of an induction coil. An alternative example is the molded bearing is placed in the center of the coil. Assuming that cobalt cemented tungsten carbide tiles made by microwave sintering and spherical tungsten carbide powder are being used, the induction coil is operated at step 118 to cause the mold to heat rapidly to approximately 1900 degrees Fahrenheit (F) or 1000 degrees Celsius (C) in an air atmosphere. The heating causes the braze to melt and infiltrate the matrix of spherical metal carbide powder and microwave sintered, cemented metal carbide tiles through capillary action and gravity. One example of a suitable braze is one made of nickel (Ni), copper (Cu), and manganese (Mn). The heating is completed at step 120 without damaging the properties of the steel mandrel or the metal carbide tiles. In the illustrated example, heating lasts less than an hour. By using a steel mold in addition to a steel mandrel, the induction heating is not only made more rapid, but also the resulting heating is more uniform. By heating the molded part for no more than one hour, properties of the microwave sintered tungsten carbide tiles tend not to be damaged and their integrity is better preserved. The shortened heating time for infiltration of the braze reduces inter-diffusion between the cobalt from the tiles and the brazing alloy. As an alternate induction heating, microwave heating, using a microwave furnace, can be used to heat the mold.

Once heating is stopped, the mold and mandrel assembly are cooled uniformly to a temperature of less than 100 degrees Celsius at step 122. The mold is then removed, at step 124, by machining, milling and/or grinding it away. Once the mold is removed, exposing the wear surface, the wear surface is machined, ground and polished to a smooth surface with predetermined dimensions at step 126, thus resulting in a finished bearing. During the finishing process, any braze on the surface of the tiles is removed, and the tiles are ground to give them a surface curvature.

FIGS. 4A-4C illustrate one example of an inner radial bearing 400 made with the process described above, and FIGS. 5A-5C illustrate mold 500 and mandrel 502 assembly for fabricating a wear surface on the inner radial bearing 400. Inner radial bearing 400 is substantially the same as inner radial bearing 202 of FIG. 2. The inner radial bearing includes a cylindrical support 402, on which is formed a wear surface 404 made according to process 100 of FIG. 1. The cylindrical support 402 is made from a section of mandrel 502, as indicated in FIG. 5C. Microwave sintered metal carbide tiles 406 form part of the wear layer matrix, along with spherical metal carbide, which surrounds the tiles. When mold 500 is press fitted to mandrel 502, as shown in FIGS. 5A-5C, the mandrel and mold cooperate to define a cylindrically shaped cavity 504 between the mold and the section of the mandrel that will form the cylindrical support 402 for the bearing, as well as circular funnel 506 that feeds into slot 508. The slot is an opening into cavity 502, through which tiles 406, metal carbide powder are loaded, and through which melted braze enters the cavity, once the mold is heated, to infiltrate the voids formed by the matrix of powder and tiles. The funnel is formed between two walls. An integrally formed circular extension 510 of the mandrel forms an inner wall of the funnel 506. An outer wall of the funnel is formed by extension 512 of the mold 500. Extension 510 of the mandrel is removed during the finishing step 126 of process 100 (FIG. 1).

FIGS. 6A-6C illustrate a second example of an inner radial bearing 600 that is made using the mold and mandrel shown in FIGS. 7A and 7B. The outer diameter of cylindrical bearing support 602 is clad with wear layer 604 made with process 100 (FIG. 1). Microwave sintered metal carbide tiles 606 form part of the wear layer matrix, along with spherical metal carbide, which surrounds the tiles. Unlike the inner radial bearing 400 of FIGS. 4A-4C, bearing 600 has lips 608 and 610 extending over each end of wear layer 604. FIGS. 7A-7B illustrate an example of mandrel 700, a section of which will form the cylindrical bearing support 602, as indicated in FIG. 7B, and a cooperating mold 702. When mold 702 is press fitted to mandrel 700, the mandrel and mold cooperate to define a cylindrically shaped cavity between the mold and the mandrel, into which microwave sintered metal carbide tiles 606 and metal carbide powder are loaded through slot 704. A funnel 706 is formed above the slot for facilitating loading of the tiles and powder, and for holding braze that will be infiltrated into the matrix of powder and tiles in the cavity when heated. Unlike funnel 506 (FIGS. 5A-5C), part 708 is placed on top of the mandrel to cooperate with the mold to form the funnel 706. An integrally formed circular section 709 of part 708 forms an inner wall of the funnel 706. An outer wall of the funnel is formed by extension 710 of the mold 702. Part 708 is removed during the finishing step 126 of process 100 (FIG. 1).

FIGS. 8A-C illustrate one example 800 of an outer bearing made using the mold and mandrel of FIGS. 9A-C. Outer bearing 800 is substantially the same as outer bearing 206 of FIG. 2, and can be used with the inner bearing shown in FIGS. 4A-4C in the manner shown in FIG. 2. The inner diameter of cylindrical bearing support 802 is clad with wear layer 804 made with process 100 (FIG. 1). Microwave sintered metal carbide tiles 806 form part of the wear layer matrix, along with spherical metal carbide, which surrounds the tiles. The cylindrical support 802 is made from a section of mandrel 902, as indicated in FIG. 9C. When mold 900 is press fitted to mandrel 902, as shown in FIGS. 9A-9C, the mandrel and mold cooperate to define a cylindrically shaped cavity 904 between the outer diameter wall of mold 900 and the section of the mandrel that will form cylindrical support 802 of the bearing, as well a circular funnel 906 that feeds into circular slot 908. The circular slot is an opening into the top of cavity 902, through which tiles 806, metal carbide powder are loaded, and through which melted braze enters the cavity, once the mold is heated, to infiltrate the voids formed by the matrix of powder and tiles. The funnel is formed between two walls. An integrally formed circular extension 910 of the mandrel forms an outer wall of the funnel 906. An inner wall of the funnel is formed by extension 912 of the mold 900. Extension 910 of the mandrel is removed during the finishing step 126 of process 100 (FIG. 1).

FIGS. 10A-10C illustrate a second example 1000 of an outer bearing made using the mold and mandrel assembly shown in FIGS. 11A-11C. The outer diameter of cylindrical bearing support 1002 is clad with wear layer 1004 made with process 100 (FIG. 1). Microwave sintered metal carbide tiles 1006 form part of the wear layer matrix, along with spherical metal carbide. Unlike the outer radial bearing 800 of FIGS. 8A-8C, bearing 1000 has lips 1008 and 1010 extending over each end of wear layer 1004. FIGS. 11A-11C illustrate an example of mandrel 700, a section of which will form the cylindrical bearing support 1002, as indicated in FIG. 11C, and a cooperating mold 702. When mold 1102 is press fitted to mandrel 1100, the mandrel and mold cooperate to define a cylindrically shaped cavity between the mold and the mandrel, into which microwave sintered metal carbide tiles 1006 and spherical metal carbide powder are loaded through slot 1104. A funnel 1106 is formed above the slot for facilitating loading of the tiles and powder, and for holding braze that will be infiltrated into the matrix of powder and tiles in the cavity when heated. Unlike funnel 906 (FIGS. 9A-9C), part 1108 is placed on top of the mandrel to cooperate with the mold to form the funnel 1106. An integrally formed circular section 1109 of part 1108 forms an inner wall of the funnel 1106. An outer wall of the funnel is formed by extension 1110 of the mold 702. Part 1108 is removed during the finishing step 126 of process 100 (FIG. 1). The finishing step includes removing part of the mandrel to arrive at the support 1002 as shown in FIGS. 10A-10C.

The foregoing description is of exemplary and preferred embodiments employing at least in part certain teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments.

The invention claimed is:

1. A method of forming a wear layer on an article, the article comprising at least in part a steel support having a surface on which the wear layer is formed, comprising:

arranging in a cavity formed between a mold and the surface of a support on which the wear layer will be formed, an array of tiles made of microwave sintered metal carbide composite, wherein voids exist between each of the tiles in the array of tiles and immediately adjacent tiles, and between the each of the tiles in the array of tiles the mold and the surface of the support;

filling the voids with metal carbide powder to form a matrix comprising the tiles and the metal carbide powder;

heating a brazing alloy to cause the brazing alloy to melt and infiltrate the matrix, heating comprising placing the mold containing the matrix, the bearing support;

allowing the matrix to cool, thereby forming a consolidation of the microwave sintered metal carbide tiles and the particles of metal carbide on the bearing support, the consolidation comprising a wear surface; and removing the mold and finishing the wear surface.

2. The method of claim 1, wherein the microwave sintered metal carbide tiles are substantially uniform in shape and dimensions over at least a portion of the wear surface.

3. The method of claim 1, wherein the mold and support are made of steel.

4. The method of claim 1, wherein the mold with the matrix and support is heated for less than an hour.

5. The method of claim 1, wherein the mold with the matrix and support is heated to a temperature of approximately 1000 degrees Celsius (C) in an air atmosphere.

6. The method of claim 1, wherein the tiles are cemented with a cobalt alloy, and wherein the particles of metal carbide are comprised of spherical tungsten carbide.

7. The method of claim 1, wherein the support is part of a radial bearing.

8. The method of claim 7, wherein the support is part of a mandrel that cooperates with the mold to form a funnel into which brazing alloy is placed prior to heating.

9. The method of claim 1, wherein the metal carbide powder is comprised of particles of metal carbide are of a spherical type and have a size of 25 to 500 microns.

10. The method of claim 9, wherein the metal carbide is tungsten carbide.

11. The method of claim 1, further comprising affixing at least one row of tiles to the surface of the mandrel support and then assembling the support and the mold to form the cavity.

12. The method of claim 1, wherein the brazing alloy contains copper (Cu), nickel (Ni), and manganese (Mn).

13. The method of claim 1, wherein each of tiles in the array of tiles made of microwave sintered metal carbide composite have a uniform size, shape and thickness.

14. The method of claim 1, wherein heating comprises placing the mold containing the matrix, the bearing support heating unmelted brazing alloy with flux in an induction furnace and operating the induction furnace for a period of time sufficient to allow the brazing alloy to melt and uniformly infiltrate the matrix without damaging the tiles.

15. A method of forming a wear layer on an article, the article comprising at least in part a steel support having a surface on which the wear layer is formed, comprising:

arranging in a cavity formed between a mold and the surface of a support on which the wear layer will be formed, an array of tiles made of microwave sintered metal carbide composite, wherein voids exist between each of the tiles in the array of tiles and immediately adjacent tiles, and between the each of the tiles in the array of tiles the mold and the surface of the support;

filling the voids with spherical metal carbide powder to form a matrix comprising the tiles and the metal carbide powder;

heating a brazing alloy to cause a brazing alloy to melt and infiltrate the matrix, heating comprising placing the mold containing the matrix, the bearing support, and unmelted brazing alloy with flux in an induction furnace and operating the induction furnace for a period of time sufficient to allow the brazing alloy to melt and uniformly infiltrate the matrix without damaging the tiles;

allowing the matrix to cool, thereby forming a consolidation of the microwave sintered metal carbide tiles and the particles of metal carbide on the bearing support, the consolidation comprising a wear surface; and removing the mold and finishing the wear surface;

wherein the microwave sintered metal carbide tiles are substantially uniform in shape and dimensions over at least a portion of the wear surface;

wherein the mold and support are made of steel; and wherein the mold with the matrix and support is heated for less than an hour.

16. The method of claim 15, wherein the mold with the matrix and support is heated to a temperature of approximately 1000 degrees Celsius (C) in an air atmosphere.

* * * * *